(12) United States Patent
Hetzroni et al.

(10) Patent No.: US 12,460,807 B2
(45) Date of Patent: Nov. 4, 2025

(54) SOUND SYNCHRONIZED LIGHT DEVICE FOR BALLOONS

(71) Applicant: Pulse LLC, Gainesville, FL (US)

(72) Inventors: Isaac Hetzroni, Parkland, FL (US); Jack H. Reinke, Gainesville, FL (US)

(73) Assignee: Pulse LLC, Gainesville, FL (US)

( * ) Notice: Subject to any disclaimer, the term of this patent is extended or adjusted under 35 U.S.C. 154(b) by 77 days.

(21) Appl. No.: 18/132,208

(22) Filed: Apr. 7, 2023

(65) Prior Publication Data

US 2023/0243493 A1   Aug. 3, 2023

Related U.S. Application Data

(63) Continuation of application No. 16/577,686, filed on Sep. 20, 2019, now Pat. No. 11,649,956.

(60) Provisional application No. 62/735,009, filed on Sep. 21, 2018.

(51) Int. Cl.

| F21V 23/04 | (2006.01) |
|---|---|
| A63H 27/10 | (2006.01) |
| F21S 10/02 | (2006.01) |
| F21V 3/02 | (2006.01) |
| F21V 23/00 | (2015.01) |

(Continued)

(52) U.S. Cl.
CPC ........ *F21V 23/0442* (2013.01); *F21S 10/023* (2013.01); *F21V 3/026* (2013.01); *F21V 23/002* (2013.01); *F21V 31/005* (2013.01); *A63H 2027/1041* (2013.01); *A63H 2027/1058* (2013.01); *F21Y 2115/10* (2016.08)

(58) Field of Classification Search
CPC ..... A63H 2027/1058; A63H 2027/1041; F21S 10/023; F21F 23/0442; F21F 23/002; F21F 31/005; F21F 3/026; F21F 3/023; F21V 23/0442; F21V 23/002; F21V 31/005; F21V 3/026; F21V 3/023
See application file for complete search history.

(56) References Cited

U.S. PATENT DOCUMENTS

| 6,106,135 A | 8/2000 | Zingale et al. | |
|---|---|---|---|
| 7,147,536 B1 * | 12/2006 | Hartelius | F21V 3/023 446/485 |
| 7,204,740 B2 | 4/2007 | Petell | |

(Continued)

FOREIGN PATENT DOCUMENTS

| CN | 2695771 Y * | 4/2005 |
|---|---|---|
| DE | 3015962 A1 | 11/1981 |

(Continued)

OTHER PUBLICATIONS https://www.pixmob.com/products; 3 pages.
Tangibleinteraction.com/rentals/pixel-wireless-dmx-light; 3 pages.

*Primary Examiner* — Daniel J Colilla
(74) *Attorney, Agent, or Firm* — Faegre Drinker Biddle & Reath LLP (57) ABSTRACT

The present disclosure provides a lighting device for use with inflatable products, such as balloons. Specifically, the lighting device may be configured to utilize external audio to produce a pattern of light corresponding with the external audio. The lighting device is able to couple to a balloon to light up the interior of the balloon without the significant loss of gas or other inflating fluid from the balloon.

20 Claims, 7 Drawing Sheets

(51) Int. Cl.
*F21V 31/00* (2006.01)
*F21Y 115/10* (2016.01)

(56) References Cited

U.S. PATENT DOCUMENTS

| | | |
|---|---|---|
| 8,292,454 B2 | 10/2012 | Schrimmer |
| 9,498,734 B2 | 11/2016 | Stieler |
| 11,649,956 B2 | 5/2023 | Hetzroni et al. |
| 2002/0089843 A1 | 7/2002 | Lou |
| 2004/0116039 A1 | 6/2004 | Mueller et al. |
| 2005/0054262 A1 | 3/2005 | Ma |
| 2006/0291217 A1 | 12/2006 | Vanderschuit |
| 2007/0167107 A1 | 7/2007 | Petell et al. |
| 2007/0189562 A1 | 8/2007 | Chiu |
| 2009/0191787 A1 | 7/2009 | Rubinstein |
| 2009/0296372 A1* | 12/2009 | Schrimmer ............ A63H 27/10 362/189 |
| 2011/0128729 A1 | 6/2011 | Ng |
| 2014/0360626 A1* | 12/2014 | Bo Stieler .............. A63H 33/22 141/98 |
| 2017/0100645 A1* | 4/2017 | Larson ................... A63H 27/10 |
| 2020/0096182 A1 | 3/2020 | Hetzroni et al. |
| 2021/0095842 A1 | 4/2021 | Kasper et al. |

FOREIGN PATENT DOCUMENTS

| | | |
|---|---|---|
| WO | 88/06474 A1 | 9/1988 |
| WO | 99/40987 A2 | 8/1999 |
| WO | 2005/120946 A2 | 12/2005 |
| WO | 2008/110832 A1 | 9/2008 |
| WO | 2013/053208 A1 | 4/2013 |

\* cited by examiner

SOUND SYNCHRONIZED LIGHT DEVICE FOR BALLOONS

CROSS REFERENCE TO RELATED APPLICATION

This application is a continuation of U.S. application Ser. No. 16/577,686, filed Sep. 20, 2019, which claims priority to U.S. Application Ser. No. 62/735,009, filed Sep. 21, 2018, the disclosures of which are hereby expressly incorporated by reference herein in its entirety.

FIELD OF THE DISCLOSURE

The present disclosure relates to a lighting device. More specifically, the present disclosure relates to a lighting device able to illuminate the interior of a balloon or another inflatable product, the lighting device also able to display color patterns in synchronization with an external audio input all while preventing significant gas loss from the balloon.

BACKGROUND AND SUMMARY OF THE DISCLOSURE

Lighting devices that create aesthetically pleasing effects are regularly used for decorative and entertaining environments. Such lighting devices are often used in a variety of contexts, such as celebrations, parties, performances, or other events. Balloons represent another staple within party, performance, and event environments. However, balloons have yet to incorporate considerable technology outside of the addition of a traditional logo or unique colors. While balloon-lighting devices are known in the art, these devices allow for only simplistic and stagnant illumination.

With the rise of music festivals and music-based parties, interactive devices that can respond to an external auditory input and create aesthetically pleasing light color patterns are desired. Such products provide a better experience for festival goers, performance and party attendees, and those involved in such events. Accordingly, the present invention is intended to provide a lighting device able to illuminate the interior of a balloon, the lighting device also able to display color patterns in synchronization with the external audio input and being light enough to be capable of being lifted by a balloon or other inflatable product filled with helium, for example.

The present disclosure provides a lighting device for use with inflatable products, such as balloons. Specifically, the lighting device may be configured to utilize external audio to produce a pattern of light corresponding with the external audio. The lighting device is able to couple to a balloon to light up the interior of the balloon without the significant loss of gas or other inflating fluid from the balloon.

In an illustrative embodiment of the present disclosure, a lighting device for use with an inflatable product is disclosed. The lighting device comprises a plug comprising a base portion and a body portion extending from the base portion; a base configured to removably couple to the base portion of the plug, forming a chamber therein; a circuit board disposed within the chamber; and at least one light coupled to the body portion of the plug, the at least one light operatively coupled to the circuit board.

The lighting device may further comprise a sleeve defining a passageway, the passageway configured to receive the plug so that the plug passes through the sleeve. In such a lighting device, the plug and the sleeve may form a fluid-tight press-fit. The sleeve may comprise a lip protruding from the sleeve to form an annular recess around an outer surface of the sleeve. The plug of the lighting device may define a passageway configured to carry wiring for operatively coupling the at least one light to the circuit board. A sealant be utilized to create a fluid-tight seal within the passageway.

The lighting device may further comprise a plurality of lights. The circuit board may include an audio input configured to generate an electrical output based on an external audio source. Such a circuit board may illuminate the at least one light of the lighting device based on the electrical output from the audio input. A portion of the body portion of the plug of the lighting device adjacent to the base portion of the plug may be recessed to form a lip. The plug and the base of the lighting device may be comprised of a lightweight polymer. The base and the plug may be configured to form a press-fit coupled configuration.

In another embodiment of the present disclosure, a lighting device for use with an inflatable product is disclosed. The lighting device comprises a plug defining an opening and comprising a base portion and a body portion extending from the base portion; a cap configured to be received within the opening of the plug and defining at least one opening; a base configured to removably couple to the base portion of the plug and forming a chamber therein; a circuit board disposed within the chamber; and at least one light protruding through the at least one opening of the cap. The at least one light is operatively coupled to the circuit board. A portion of the body portion of the plug adjacent to the base portion is recessed.

The base of the lighting device may further comprise a plurality of apertures configured to receive a corresponding plurality of tabs disposed on the base portion of the plug. The circuit board may comprise an audio input configured to generate an electrical output based on an external audio source. Such a circuit board may illuminate the at least one light of the lighting device based on the electrical output from the audio input. The base may define an opening near the audio input of the circuit board to facilitate passage of the external audio source to the audio input. The circuit board may include a switch to selectively place the circuit board in operation. The plug may define a passageway configured to carry wiring for operatively coupling the at least one light to the circuit board.

In yet another embodiment of the present disclosure, a method of assembling a light-up balloon is disclosed. The method comprises the steps of positioning a balloon stem of a balloon over a body portion of a plug of a lighting device, the plug further comprising a base portion configured to removably couple with a base of the lighting device and at least one light disposed on the plug, so that the at least one light is positioned within an interior of the balloon; activating a circuit board disposed within a chamber formed by the base and the plug of the lighting device; and providing power to the at least one light positioned within the interior of the balloon so that the light is operational.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the views. The exemplifications set out herein illustrate exemplary embodiments of the invention and such exemplifications are not to be construed as limiting the scope of the invention in any manner.

DETAILED DESCRIPTION

Figure 1:
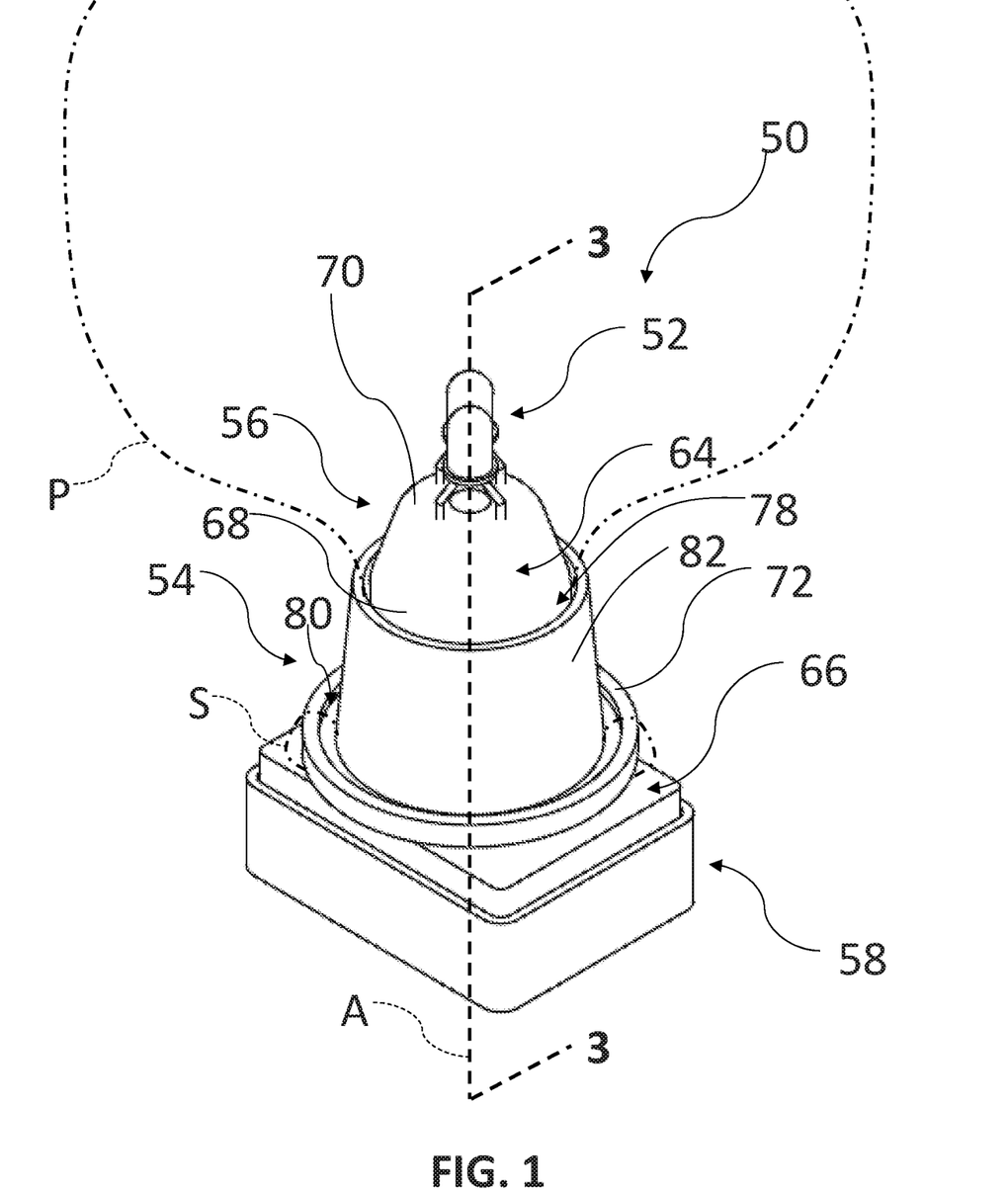
FIG. 1 illustrates an assembled perspective view of a first embodiment of a lighting device of the present disclosure for use with an inflatable product, the lighting device including a base, a plug removably coupled to the base, a sleeve configured to receive the plug, and lights disposed on the plug.
Figure 2:
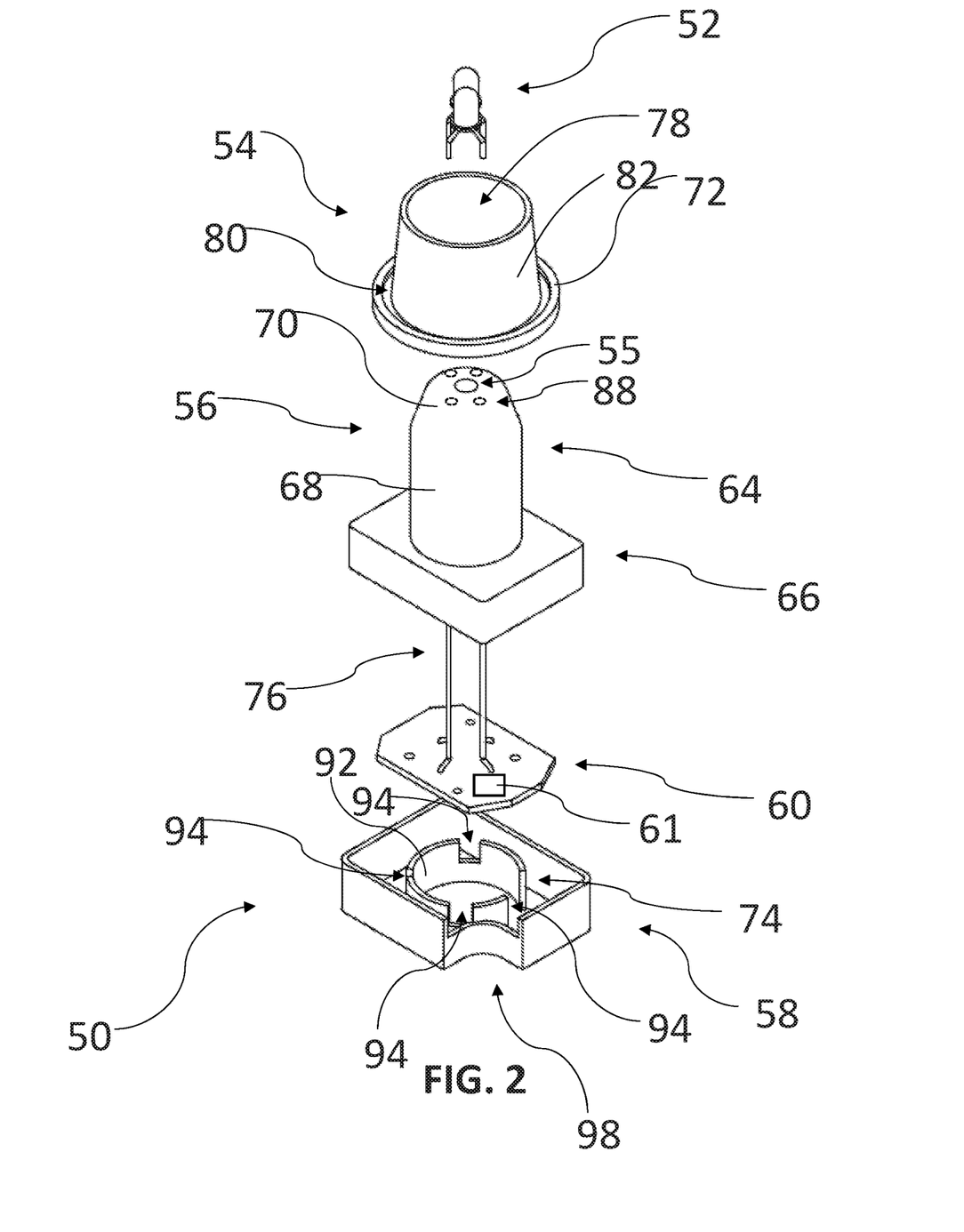
FIG. 2 illustrates an exploded perspective view of the lighting device of FIG. 1, further illustrating a circuit board and wiring disposed within the lighting device.

Referring initially to FIGS. 1 and 2, a lighting device 50 is disclosed for use with an inflatable product P, such as a balloon. From top to bottom in FIG. 2, the lighting device 50 includes at least one light 52, a sleeve 54, a plug 56, a base 58, a circuit board 60, and a plurality of wires 76. Each element of the lighting device 50 is described further below.

The plug 56 of the lighting device 50 includes a body portion 64 and a base portion 66. The base portion 66 of the plug 56 is configured to be received by the base 58 in a press-fit configuration, so that the base 58 and the base portion 66 are removably coupled together. In the illustrative embodiment shown, the base portion 66 and the base 58 have substantially rectangular outer perimeters, such that the rectangular base portion 66 fits within the rectangular base 58. In other embodiments, the base portion 66 and the base 58 may form alternate shapes and sizes that facilitate the press-fit coupling between the base portion 66 of the plug 56 and the base 58. When coupled together, the base portion 66 of the plug 56 and the base 58 cooperate to form a chamber 74 for the circuit board 60. When uncoupled, the electronic components in the chamber 74, including the circuit board 60, may be accessed.

The body portion 64 of the plug 56 may comprise a middle portion 68 that extends from the base portion 66 of the plug 56, with a cap portion 70 disposed on the middle portion 68. In the illustrated embodiment, the middle portion 68 forms a cylinder, while the cap portion 70 forms a truncated cone. The plug 56 comprises a plurality of passageways 88, which may be exposed at cap portion 70 during assembly (as shown in phantom in FIG. 2) and sealed closed at cap portion 70 when assembled (FIG. 1). The passageways 88 run through the length of the body portion 64 of the plug 56 parallel to axis A. The passageways 88 may accommodate wires 76 that connect lights 52 to circuit board 60, as described further below. While the illustrated embodiment comprises four pathways 88, other embodiments may include additional or fewer pathways 88, depending on the size and type of the inflatable product P, or on the number and type of lights 52 and wires 76 utilized.

The sleeve 54 is configured to receive the body portion 64 of the plug 56 along axis A, as shown by FIG. 1. In the illustrated embodiment, the sleeve 54 forms a truncated cone defining a passageway 78, so that the sleeve 54 is configured to slide over the body portion 64 of the plug 56 and the plug 56 is received by the passageway 78 of the sleeve 54. In other embodiments, the sleeve 54 and the body portion 64 of the plug 56 may be formed in other shapes which facilitate the coupling between the sleeve 54 and the plug 56. For example, when coupled, as shown in FIG. 1, the sleeve 54 surrounds the plug 56. The sleeve 54 further comprises a lip 72 protruding from the sleeve 54 and forming an annular recess 80 around the outer surface 82 of the sleeve 54 to facilitate the coupling of the device 50 with the inflatable product P so that the device 50 stays in place relative to the inflatable product P, as described further below. A seal (not shown) may be positioned annularly on the outside of the body portion 64 of the plug 56 to facilitate the fluid tight seal between the sleeve 54 and the plug 56 when coupled. The seal (not shown) may be made of rubber or another elastic material and may comprise an O-ring seal.

Lights 52 are coupled to the cap portion 70 of the plug 56 to provide internal illumination to the inflatable product P as described herein. The lights 52 may be LED lights or other suitable lights. While the illustrated embodiment shows two lights 52 secured to the plug 56, the type and number of lights 52 in the present disclosure may vary in type and quantity to sufficiently light up various types, sizes, and shapes of inflatable products P and/or create different light effects according to the desire of the user. As described further herein, the lights 52 may be coupled to the circuit board 60 via the wiring 76 extending through the passageways 88 in the plug 56. In this way, the wires 76 may act as tethers holding the lights 52 in place relative to the circuit board 60. The lights 52 may also be secured to the plug 56 through use of a sealant, such as an adhesive, at the cap portion 70 of the plug 56. This sealant may have the additional benefit of at least partially filling the passageways 88, as shown in FIG. 1, to block inflation fluid from within the balloon P from leaking through the passageways 88 of the plug 56. In the illustrated embodiment, the sealant is placed on the cap portion 70 of the plug 56 to prevent the sealant from potentially damaging any electronics on circuit board 60. Additionally, the sealant in the illustrated embodiment may be applied to any other voids within the plug 56 which may otherwise allow the inflation fluid to escape from the inside of the balloon P.

Figure 3:
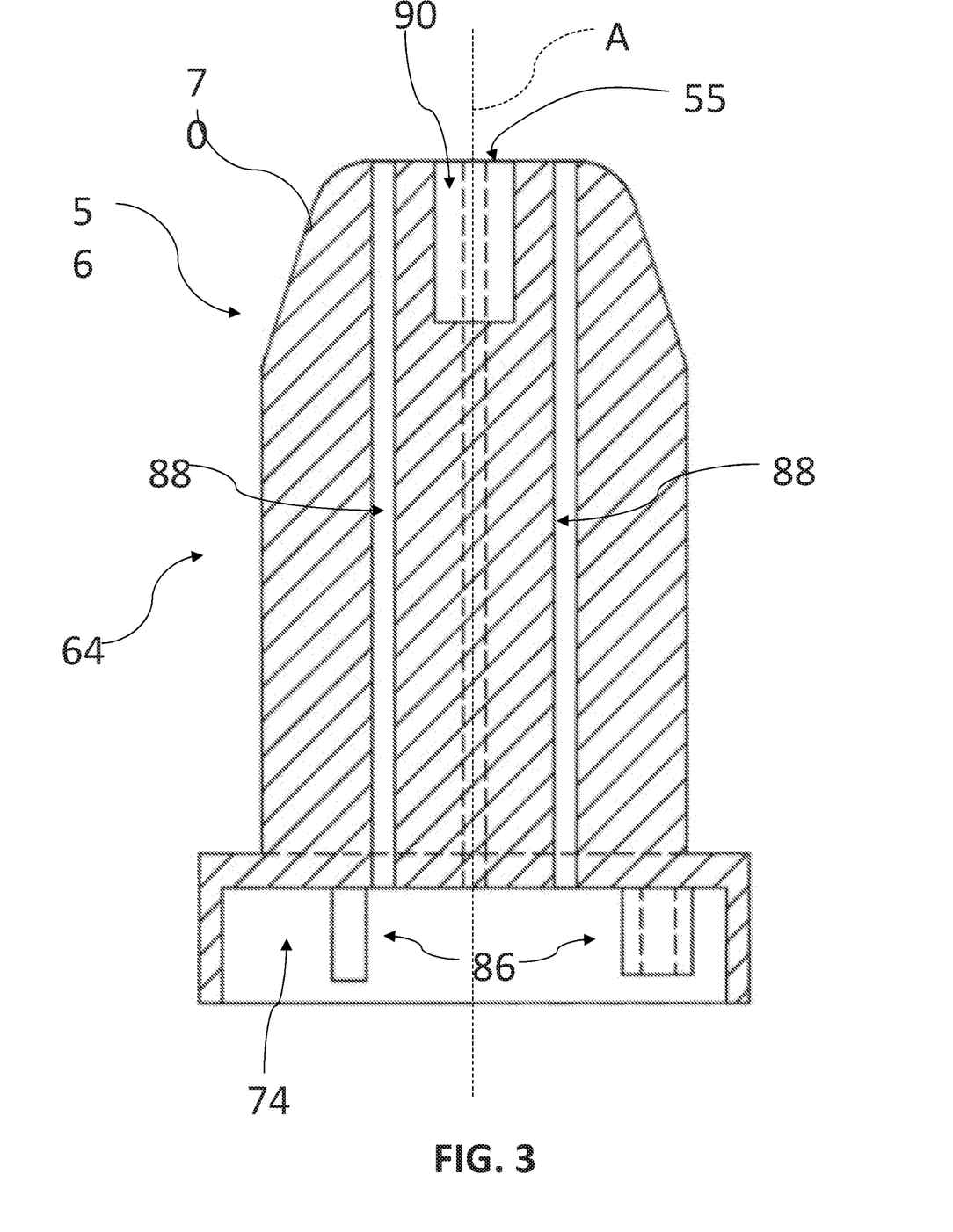
FIG. 3 illustrates a cross-sectional view of the plug of the lighting device of FIG. 1, taken along line 3-3 of FIG. 1.

Now referring to FIG. 3, a cross-sectional view of the plug 56 is shown. The plug 56 includes protrusions 86 on the bottom recessed portion of plug 56 to secure the circuit board 60 (FIG. 2) within the chamber 74. The plug 56 also includes a central aperture 55, which provides the entrance to a compartment 90 recessed within the cap portion 70 of the body portion 64 of the plug 56. The compartment 90 provides an area for excess wiring. The compartment 90 can be shaped and sized in any manner desired that does not negatively interfere with the passageways 88 or otherwise negatively interfere with the operation of the lighting device 50.

Figure 4:
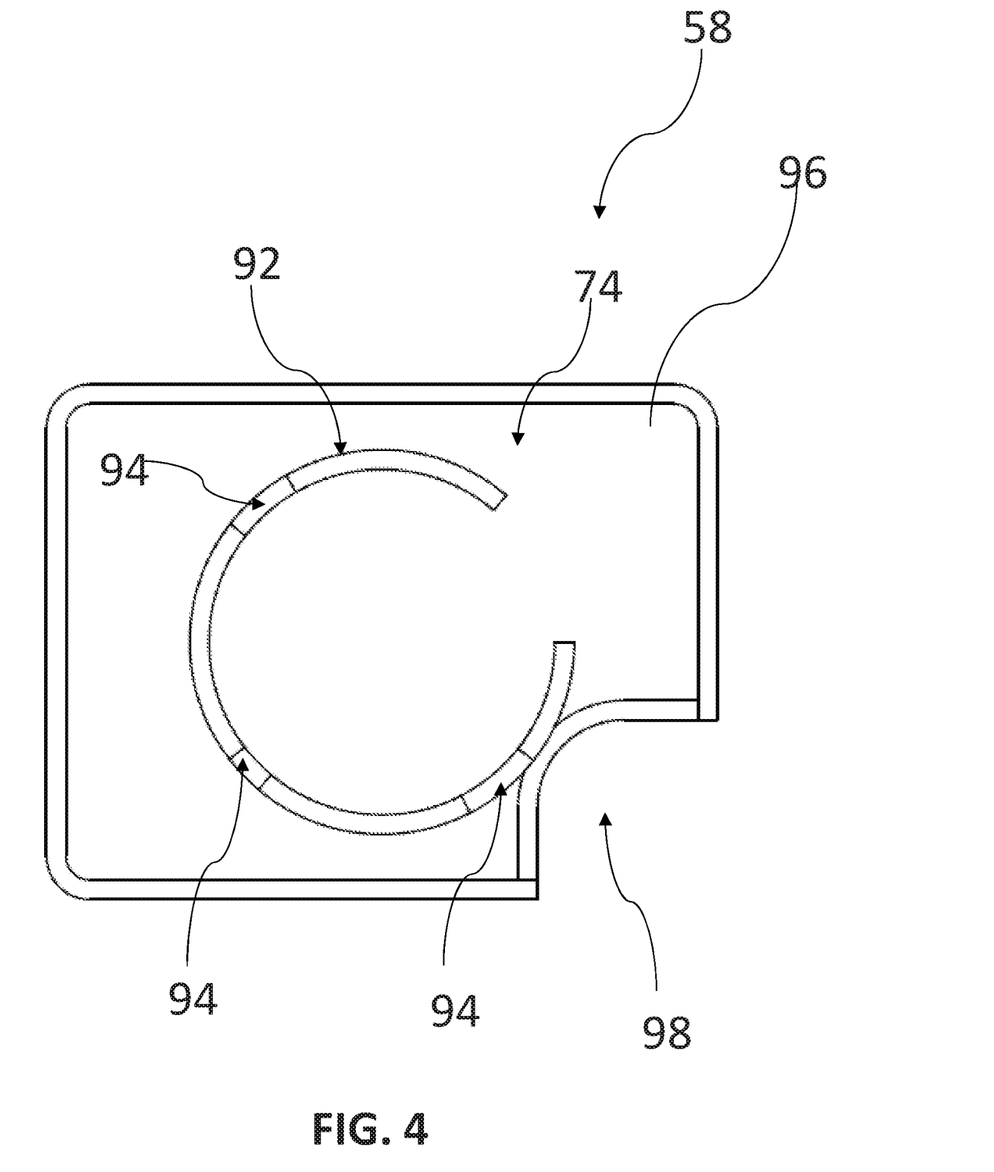
FIG. 4 illustrates a top view of the base of the lighting device of FIG. 1.

Now referring to FIG. 4, the base 58 is shown. The base 58 includes a wall 92 positioned approximately in the center of the base 58. In some embodiments, a replaceable, mobile power source, such as a battery (not shown) may also be positioned within the chamber 74 to power the circuit board 60 (FIG. 2), and the wall 92 may be configured to receive the battery. The wall 92 also serves to help protect electronics within the chamber 74. The chamber 74 can be accessed to be operated or replaced by uncoupling the base 58 and the plug 56 (FIG. 3). In other embodiments, the lighting device 50 may be powered by an alternate power source, such as being hardwired. The wall 92 may contain multiple cutout regions 94. The number and size of cutout regions 94 may be increased or decreased from what is shown in the illustrated embodiment. The wall 92 may form a circle as shown in FIG. 4; in other embodiments, the wall 92 may form a number of shapes.

Now returning to FIG. 2, the circuit board 60 is disposed within the chamber 74 defined by the coupling between the plug 56 and the base 58. The protrusions 86 (FIG. 2) of the plug 56 are configured to cooperate with the wall 92 of the base 58 to secure the circuit board 60 within the chamber 74. The circuit board 60 is in operative communication with the lights 52 through the wiring 76 which is run from the lights 52 to the circuit board 60 through the passageways 88 of the plug 56, as described above. Specifically, the wiring 76 may be comprised of soldering wire to provide strength against external force and provide efficient conductivity to illuminate the lights 52.

Referring still to FIG. 2, the circuit board 60 further includes an audio input 61 and is configured to synchronize the lights 52 with external audio received by the audio input 61. The audio input 61 may be a condenser microphone whose electrical output varies based on the pitch and/or volume of the external audio. The circuit board 60 may then control the lights 52 in real time based on the electrical output from the condenser microphone. For example, the circuit board 60 may illuminate one light 52 when the electrical output is below a predetermined value and both lights 52 when the electrical output is at or above the predetermined value.

Referring to FIGS. 2 and 4, the base 58 may define a corresponding opening 98 within the bottom surface 96 of the base 58. The opening 98 is located within the bottom surface 96 of the base 58 near the audio input 61, such as the above-described condenser microphone (not shown), located on the circuit board 60. The opening 98 is configured to allow sound to pass more readily through the base 58 to the audio input 61 of the circuit board 60 to allow efficient synchronization of the lights 52 with external audio, or other cooperation between the lights 52 and external audio as desired. The opening 98 can be shaped or sized in any way appropriate to allow sound to reach the circuit board 60. The opening 98 may also provide a passageway for wiring to pass through to a power source to provide power to the lights 52.

Referring still to FIG. 2, the body portion 64 of the plug 56 of the lighting device 50 is shaped and sized to be received by the sleeve 54, while the base portion 66 of the plug 56 is sized and shaped to be received by the base 58 in a press-fit configuration. In use, a balloon stem S may be positioned within the passageway 78 of the sleeve 54 and stretched over the plug 56 so that the material of the balloon stem is compressed between the sleeve 54 and the plug 56, creating a substantially fluid-tight seal within the balloon stem S of the balloon P to prevent the escape of inflation fluid, facilitating the continued inflated status of the balloon P. In some embodiments, the balloon stem S may be further stretched back over the lip 72 of sleeve 54 to be received within the annular recess 80 to further secure the balloon.

Such placement also allows for the lights 52 to be positioned within the balloon while other electronic components are accessible from outside the inflated balloon as described herein. The plug 56 can be removed from the sleeve 54 to purposely release inflatable fluid within the balloon P, allowing the balloon to deflate and uncouple from the lighting device 50. This allows the lighting device 50 to be reusable and swapped between various balloons. In one embodiment, the plug 56, the sleeve 54, and the base 58 may be comprised of a lightweight polymer, metal, or another lightweight material, allowing a balloon P filled with helium or other inflation fluid to lift the lighting device 50.

Referring generally to FIGS. 5-7B, another embodiment of the lighting device 50 is disclosed. A lighting device 150 has substantially the same structure and operation as the lighting device 50, except as described below. Like elements of the lighting device 50 are identified by adding "100" to the corresponding reference number of the lighting device 50.

Figure 5:
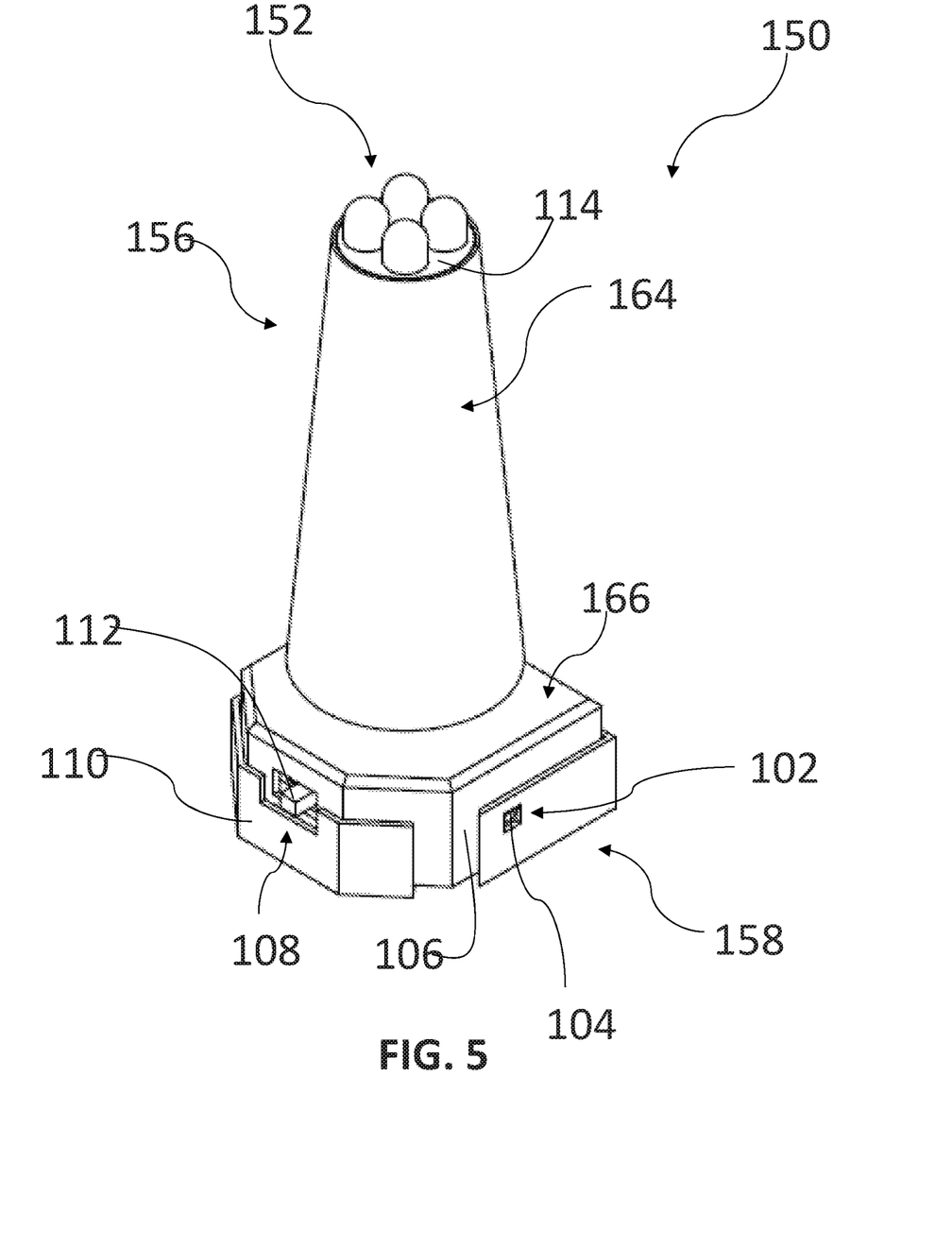
FIG. 5 illustrates an assembled perspective view of a second embodiment of a lighting device of the present disclosure, the lighting device including a base, a plug removably coupled to the base, and lights disposed on the plug.
Figure 6:
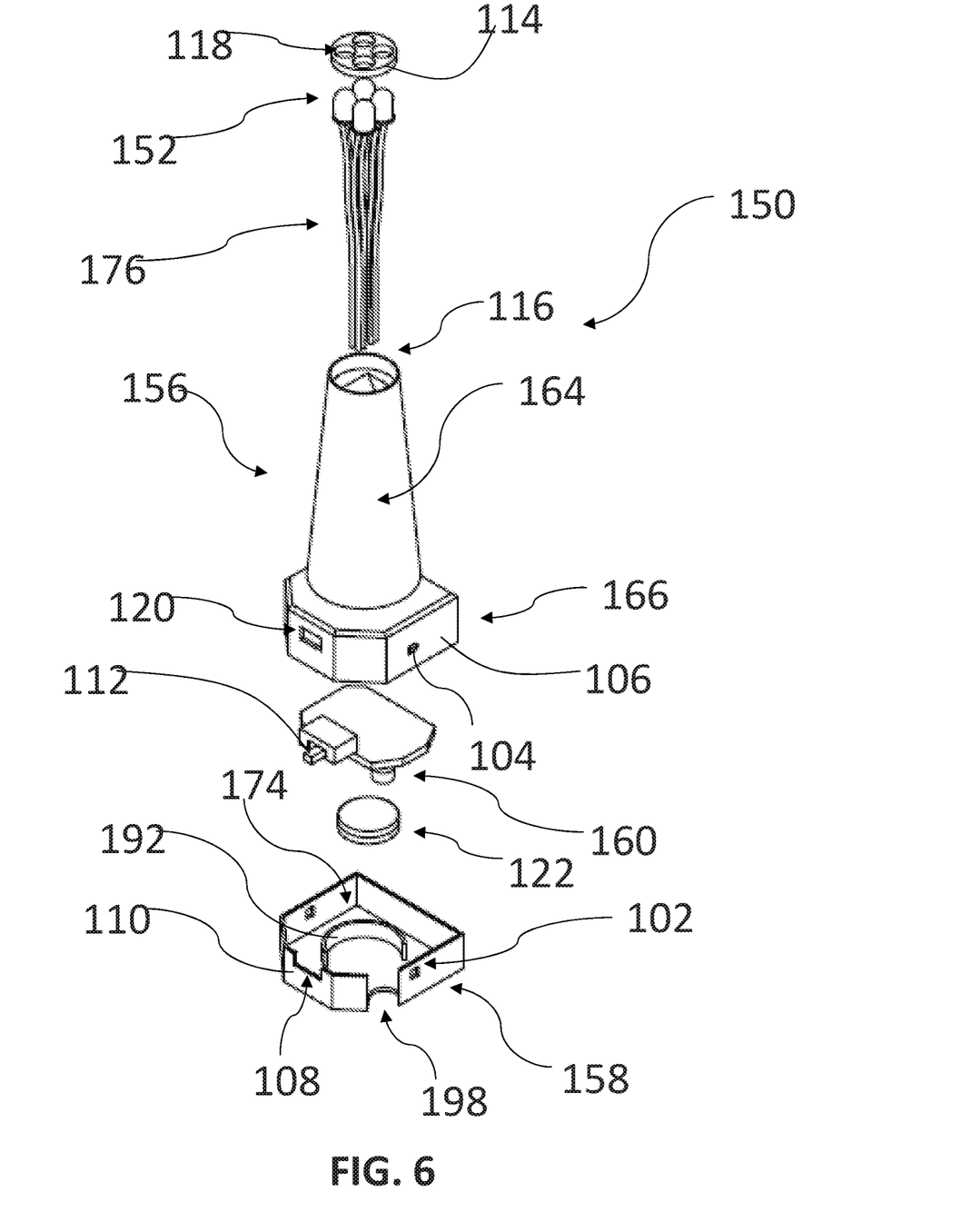
FIG. 6 illustrates an exploded perspective view of the lighting device of FIG. 5, further illustrating a circuit board, a battery, and wiring disposed within the lighting device.

Referring now to FIGS. 5-6, the lighting device 150 includes a plug 156 having a base portion 166 and a body portion 164, wherein the base portion 166 is configured to couple to a base 158. Specifically, the base 158 and the plug 156 are sized and shaped to form a press-fit coupling configuration, defining a chamber 174 between the plug 156 and the base 158. To provide security to the coupling between the plug 156 and the base 158, the base 158 includes a plurality of apertures 102, each of the apertures 102 configured to receive a tab 104 disposed on the outer surface 106 of the plug 156. The base 158 further includes a recess 108 in a sidewall 110 of the base to allow a switch 112 to pass through as described herein.

The body portion 164 of the plug 156 includes a removable cap 114 configured to be received within an opening 116 defined by the body portion 164. For example, the cap 114 may comprise a chamfered shape configured to press-fit within the opening 116 defined by the body portion 164. The cap 114 may be further secured to the body portion 164 of the plug 156 using a sealant and/or adhesive. The removeable cap 114 defines a plurality of apertures 118 sized and shaped to receive a corresponding plurality of lights 152. In the illustrated embodiment, for example, the removeable cap 114 includes four apertures 118 corresponding to four lights 152. In other embodiments, more or fewer apertures 118 and lights 152 may be utilized. The lights 152 may be sized to rest atop the cap 114 and may be adhered or otherwise coupled to the cap 114 in a sealed manner.

Now referring specifically to FIG. 6, the lights 152 include wiring 176 which runs through the plug 156 to operatively couple the lights 152 to a circuit board 160 disposed within the chamber 174. The wiring 176 may extend downward from the lights 152 through the apertures 118 in the cap 114 toward the circuit board 160. The circuit board 160 includes a switch 112, which, when assembled, is passed through an aperture 120 defined by the base portion 166 of the plug 156 and the recess 108 of the sidewall 110 of the base 158 as described above so that a user may access the switch 112. A battery 122 is further disposed within the chamber 174 in operative communication with the circuit board 160 to supply power to the circuit board 160 when placed in operation by a user via the switch 112. For example, the switch regulates the power to the circuit board-providing power in one configuration and turning off the circuit board 160 in another configuration. The battery 122 is received within a wall 192 within the base 158 of the lighting device 150. A cut-out 198 within the base 158 may serve the same purpose as the opening 98 defined by the base 158 as described above in relation to lighting device 50.

Figures 7A, 7B:
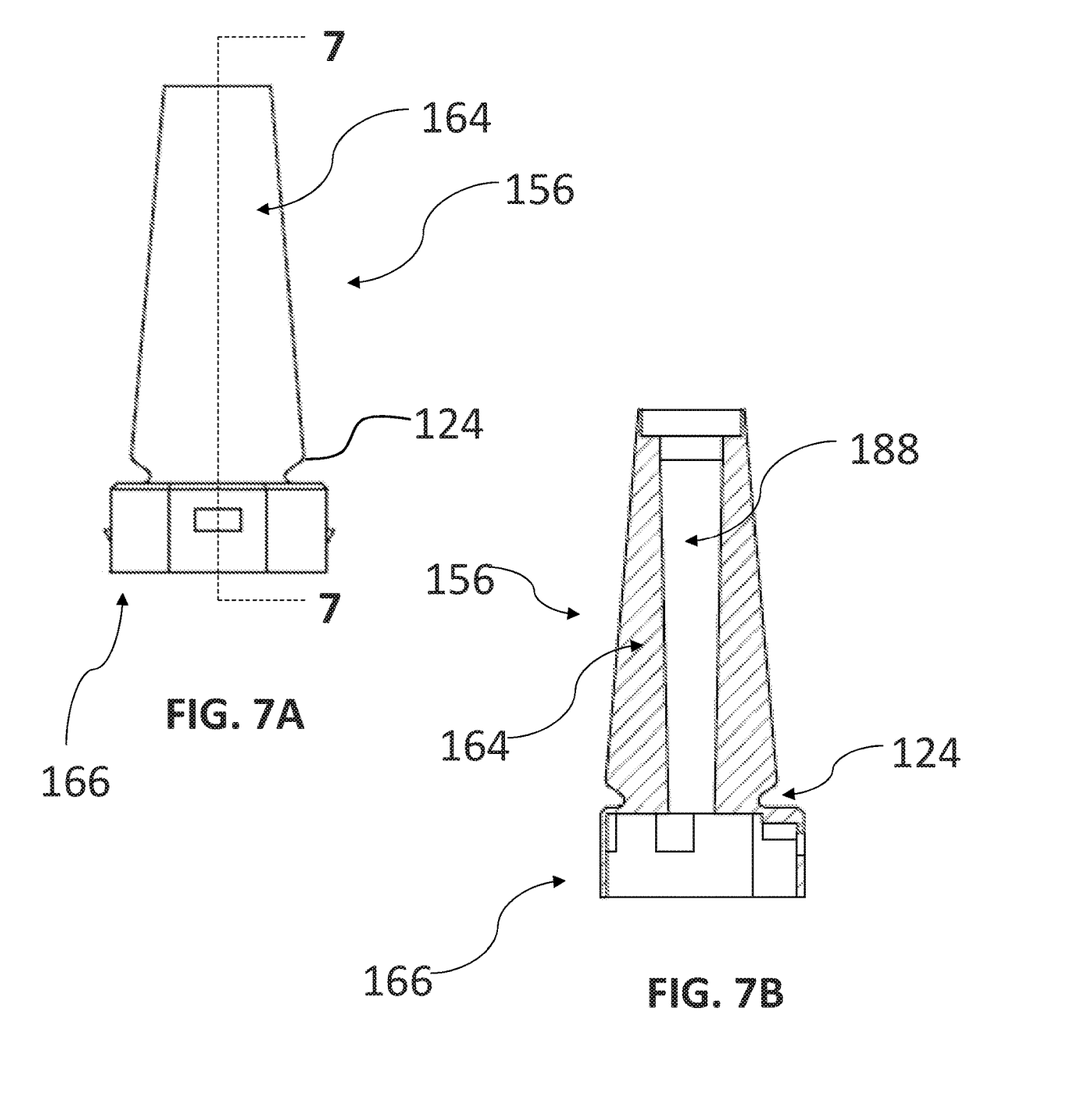
FIG. 7A illustrates a side view of the plug of the lighting device of FIG. 5.
FIG. 7B illustrates a cross-sectional view of the plug of FIG. 7A, taken along line 7-7 of FIG. 7A.

Now referring to FIGS. 7A-7B, the plug 156 comprises a single passageway 188 running through the length of the plug 156 parallel to axis A to form a pathway for wiring 176 (FIG. 6) attached to the circuit board 160 to run the length of the plug 156 and couple to the lights 152 (FIG. 6). The aperture 55 and resulting compartment 90 of the device 50 as shown in FIG. 3. is omitted in this embodiment. Additionally, because this alternative embodiment does not include a sleeve, a portion of the body portion 164 of the plug 156 closest to the base portion 166 recesses to form a lip 124 to further secure the inflatable product. For example, in use, a balloon stem may be positioned and stretched over the plug 156, with the bottom of the balloon stem elastically clinging to the lip 124 so that the lighting device 150 does not slip out of the balloon. The elastic connection between the balloon and the plug 156 further prevents inflation fluid from escaping from the balloon.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A lighting device for use with an inflatable product, the lighting device comprising:
   a plug;
   a cap configured to be coupled to a top rim of the plug, the cap defining at least one opening;
      wherein the cap is received in an opening of the plug such that the cap is flush with the top rim of the plug;
   a base configured to couple to the plug opposite of the cap, forming a chamber therein;
   a circuit board disposed within the chamber; and
   a light protruding through the at least one opening of the cap, the light operatively coupled to the circuit board.

2. The lighting device of claim 1, wherein the plug defines a passageway configured to carry wiring for operatively coupling the at least one light to the circuit board.

3. The lighting device of claim 2, wherein a sealant creates a fluid-tight seal within the passageway.

4. The lighting device of claim 1, further comprising a plurality of lights.

5. The lighting device of claim 1, the circuit board including an audio input configured to generate an electrical output based on an external audio source.

6. The lighting device of claim 5, wherein the circuit board illuminates the at least one light based on the electrical output from the audio input.

7. The lighting device of claim 1, wherein a portion of a body portion of the plug adjacent to a base portion of the plug is recessed to form a lip;
   wherein the lip may facilitate the coupling of the lighting device with the inflatable product.

8. The lighting device of claim 1, wherein the plug and the base are comprised of a polymer, and wherein the plug and the base are capable of being lifted by a balloon inflated with helium.

9. The lighting device of claim 1, wherein the base and the plug are configured to form a press-fit coupled configuration.

10. The lighting device of claim 1, wherein the plug is a truncated cone.

11. A lighting device for use with an inflatable product, the lighting device comprising:
    a plug defining an opening and comprising a base portion and a body portion extending from the base portion, wherein the body portion comprises a lip to facilitate the coupling of the lighting device with the inflatable product;
    a cap configured to be received within the opening of the plug, the cap defining at least one opening;
       a base configured to couple to the base portion of the plug, forming a chamber therein, the base defining an aperture for sound passage;
       a circuit board disposed within the chamber;
    at least one light protruding through the at least one opening of the cap, the at least one light operatively coupled to the circuit board.

12. The lighting device of claim 11, the base further comprising a plurality of apertures configured to receive a corresponding plurality of tabs disposed on the base portion of the plug.

13. The lighting device of claim 11, the circuit board comprising an audio input configured to generate an electrical output based on an external audio source.

14. The lighting device of claim 13, wherein the circuit board illuminates the at least one light based on the electrical output from the audio input.

15. The lighting device of claim 14, wherein the base defines an opening near the audio input of the circuit board to facilitate passage of the external audio source to the audio input.

16. The lighting device of claim 11, wherein the circuit board includes a switch to selectively place the circuit board in operation.

17. The lighting device of claim 11, wherein the plug defines a passageway configured to carry wiring for operatively coupling the at least one light to the circuit board.

18. The lighting device of claim 11, wherein the plug is a truncated cone.

19. A lighting device for use with an inflatable product, the lighting device comprising:
    a plug;
    a flat cap configured to be coupled to the plug, the flat cap defining at least one opening;
       wherein the flat cap is received in an opening of the plug such that the flat cap is flush with a rim of the plug;
    a base configured to couple to the plug opposite of the flat cap, forming a chamber therein;
    a circuit board disposed within the chamber; and
    at least one light protruding through the at least one opening of the flat cap, the light operatively coupled to the circuit board.

20. The lighting device of claim 19, the circuit board comprising an audio input configured to generate an electrical output based on an external audio source;
    wherein the circuit board illuminates the at least one light based on the electrical output from the audio input.

* * * * *